(12) United States Patent
Kim et al.

(10) Patent No.: US 8,867,188 B2
(45) Date of Patent: Oct. 21, 2014

(54) MULTILAYER CERAMIC ELECTRONIC COMPONENT AND FABRICATING METHOD THEREOF

(75) Inventors: Joon Hee Kim, Hwaseong (KR); Jong Hoon Bae, Anyang (KR); Byung Soo Kim, Suwon (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 460 days.

(21) Appl. No.: 13/074,468

(22) Filed: Mar. 29, 2011

(65) Prior Publication Data

US 2012/0140377 A1   Jun. 7, 2012

(30) Foreign Application Priority Data

Dec. 6, 2010   (KR) ................ 10-2010-0123421

(51) Int. Cl.
*H01G 4/06* (2006.01)
*H01G 4/005* (2006.01)
*H01G 4/30* (2006.01)
*H01G 4/12* (2006.01)

(52) U.S. Cl.
CPC .............. *H01G 4/1227* (2013.01); *H01G 4/30* (2013.01)
USPC ......................................... 361/311; 361/303

(58) Field of Classification Search
USPC ................ 361/303, 305, 311, 321.1–321.4
See application file for complete search history.

(56) References Cited

U.S. PATENT DOCUMENTS

| 6,930,876 B1* | 8/2005 | Noguchi et al. .............. 361/311 |
| 7,089,659 B2* | 8/2006 | Iwaida et al. ................... 29/830 |
| 2001/0006451 A1* | 7/2001 | Miyazaki et al. .......... 361/321.2 |

FOREIGN PATENT DOCUMENTS

| JP | 05-101969 | 4/1993 |
| JP | 2001-232617 | 8/2001 |

* cited by examiner

*Primary Examiner* — Eric Thomas
(74) *Attorney, Agent, or Firm* — McDermott Will & Emery LLP

(57) ABSTRACT

There are provided a multilayer ceramic electronic component and a fabricating method thereof. The multilayer ceramic electronic component includes: a multilayer ceramic body including a first ceramic powder and having a plurality of ceramic sheets stacked therein, each ceramic sheet having a thickness of 1 μm or less; internal electrode patterns formed on the plurality of ceramic sheets; and dielectric patterns formed on the ceramic sheets to enclose the internal electrode patterns, the dielectric patterns including a second ceramic powder having a particle size smaller than that of the first ceramic powder and each having a thickness equal to or thinner than that of each of the internal electrode patterns.

7 Claims, 4 Drawing Sheets

MULTILAYER CERAMIC ELECTRONIC COMPONENT AND FABRICATING METHOD THEREOF

CROSS-REFERENCE TO RELATED APPLICATIONS

This application claims the priority of Korean Patent Application No. 10-2010-0123421 filed on Dec. 6, 2010, in the Korean Intellectual Property Office, the disclosure of which is incorporated herein by reference.

BACKGROUND OF THE INVENTION

1. Field of the Invention

The present invention relates to a multilayer ceramic electronic component and a fabricating method thereof, and more particularly, to a multilayer ceramic electronic component having improved reliability due to a low short-circuit generation rate therein while having thin layers of 1 μm or less, and a fabricating method thereof.

2. Description of the Related Art

Generally, multilayer ceramic electronic components using a ceramic material, such as a capacitor, an inductor, a piezoelectric element, a varistor, a themistor, or the like, include a multilayer ceramic body configured of a plurality of ceramic layers, internal electrodes formed within the multilayer ceramic body, and external electrodes formed on surfaces of the multilayer ceramic body to be connected to the internal electrodes.

In accordance with the recent trend towards high performance and high integration in electronic devices, the demand for compact, highly integrated multilayer ceramic electronic components has increased.

Consequently, research into a compact multilayer ceramic capacitor having thin layers, high capacitance, low impedance in a high frequency region, and the like, has been actively conducted.

Generally, in order to fabricate a multilayer ceramic capacitor, ceramic green sheets are fabricated and conductive paste layers are printed on the ceramic green sheets to form internal electrode patterns thereon. Then, the ceramic green sheets having the internal electrode patterns formed thereon are stacked in amounts ranging from several tens of layers to several hundreds of layers to fabricate a green ceramic stack. Thereafter, the green ceramic stack is compressed under conditions of high temperature and high pressure to fabricate a multilayer ceramic body, and a cutting process is then performed on the multilayer ceramic body to fabricate a green chip. Then, the green chip is subjected to processes such as a bake-out process, a firing process, a polishing process, and the like, and finally external electrodes are formed thereon to complete the fabrication of the multilayer ceramic capacitor.

In order to fabricate a multilayer ceramic capacitor having ultrahigh capacitance, ceramic green sheets should be fabricated using fine barium titanate ($BaTiO_3$) particles. When fine barium titanate particles are used therein, the content of a binder should be increased in order to secure film strength of the ceramic green sheet in a thin film, which may lead to serious deformations of the internal electrodes and thereby cause a defect in an electrode structure, a cutting defect such as short-circuit of the electrode, and the like. Accordingly, the reliability of a product may be deteriorated.

SUMMARY OF THE INVENTION

An aspect of the present invention provides a multilayer ceramic electronic component capable of preventing the deformation of internal electrodes to avoid a defect in an electrode structure and a cutting defect, thereby improving the reliability of a product, and a fabricating method thereof.

According to an aspect of the present invention, there is provided a multilayer ceramic electronic component, including: a multilayer ceramic body including a first ceramic powder and having a plurality of ceramic sheets stacked therein, each ceramic sheet having a thickness of 1 μm or less; internal electrode patterns formed on the plurality of ceramic sheets; and dielectric patterns formed on the ceramic sheets to enclose the internal electrode patterns, the dielectric patterns including a second ceramic powder having a particle size smaller than that of the first ceramic powder and each having a thickness equal to or thinner than that of each of the internal electrode patterns.

The particle size of the first ceramic powder may be 100 nm or less, and the particle size of the second ceramic powder may be 80 nm or less.

Each of the ceramic sheets may have a thickness of 0.7 to 0.9 μm.

The dielectric patterns and the internal electrode patterns may have an interval of 0.8 μm or less therebetween.

The ceramic sheets may be formed by applying a first ceramic paste, including the first ceramic powder, an organic binder including ethylcellulose and polyvinyl butyral, and an organic solvent, and the dielectric patterns may be formed by applying a second ceramic paste, including the second ceramic powder, an organic binder including ethylcellulose and polyvinyl butyral, and an organic solvent.

A content of the organic binder included in the first or second ceramic paste may be 10 to 20 wt % with respect to 100 wt % of the first or second ceramic paste.

The organic binder may have a ratio of the ethylcellulose and the polyvinyl butyral ranging from 10:90 to 20:80.

According to another aspect of the present invention, there is provided a fabricating method of a multilayer ceramic, the fabricating method including: preparing a plurality of ceramic sheets including a first ceramic powder; printing internal electrode patterns on the plurality of ceramic sheets; forming dielectric patterns on the ceramic sheets to enclose the internal electrode patterns, the dielectric patterns including a second ceramic powder having a particle size smaller than that of the first ceramic powder, and each having a thickness equal to or thinner than that of each of the internal electrode patterns; and compressing and stacking the plurality of ceramic sheets having the internal electrode patterns and the dielectric patterns formed thereon using a thermal transfer method.

Each of the ceramic sheets may have a thickness of 1 μm or less.

The thermal transfer method may be performed at a temperature of 80° C. or less and at a pressure of 20 tons or less.

The ceramic sheets may be formed by applying a first ceramic paste, including the first ceramic powder, an organic binder including ethylcellulose and polyvinyl butyral, and an organic solvent, and the dielectric patterns may be formed by applying a second ceramic paste, including the second ceramic powder, an organic binder including ethylcellulose and polyvinyl butyral, and an organic solvent.

A content of the organic binder included in the first or second ceramic paste may be 10 to 20 wt % with respect to 100 wt % of the first or second ceramic paste.

The organic binder may have a ratio of the ethylcellulose and the polyvinyl butyral ranging from 10:90 to 20:80.

A rate of change in a length of the internal electrode patterns by the stacking and compressing thereof may be 10% or less.

A rate of change in a length of the internal electrode patterns by stacking and compressing thereof may be 5% or less.

The particle size of the first ceramic powder may be 100 nm or less, and the particle size of the second ceramic powder may be 80 nm or less.

Each of the ceramic sheets may have a thickness of 0.7 to 0.9 μm.

The dielectric patterns and the internal electrode patterns may have an interval of 0.8 μm or less therebetween.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
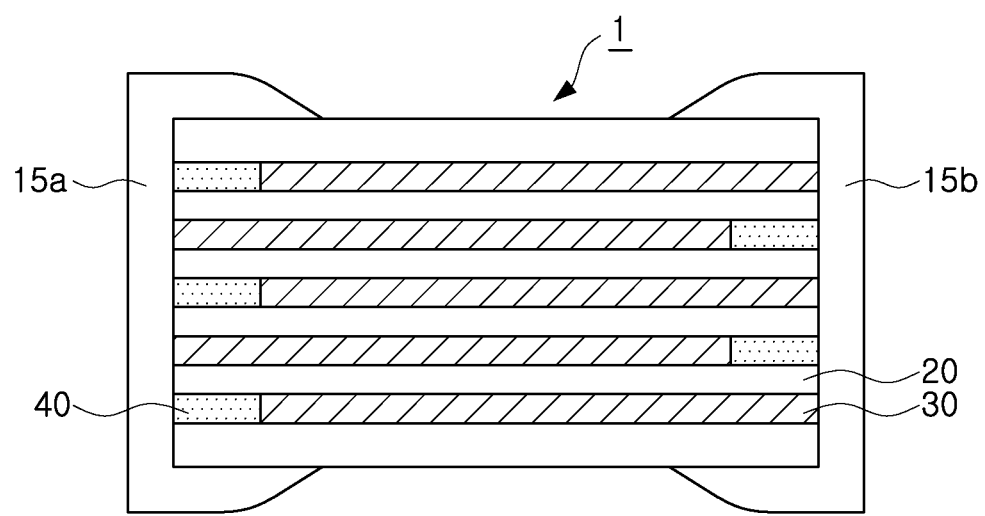
FIG. 1 is a cross-sectional view of a multilayer ceramic electronic component according to an exemplary embodiment of the present invention.

Exemplary embodiments of the present invention will be described in detail with reference to the accompanying drawings. However, in describing the exemplary embodiments of the present invention, detailed descriptions of well-known functions or constructions will be omitted so as not to obscure the description of the present invention with unnecessary detail.

The same reference numerals will be used throughout to designate the same or like elements in the accompanying drawings.

In addition, unless explicitly described to the contrary, the word "include" and variations such as "includes" or "including," will be understood to imply the inclusion of stated elements but not the exclusion of any other elements.

Figure 2A:
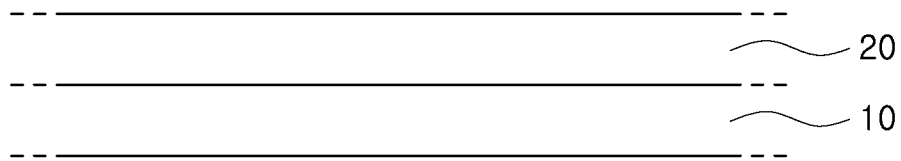
FIGS. 2A through 2C are views showing a fabricating method of a multilayer ceramic electronic component according to an exemplary embodiment of the present invention.
Figure 2B:
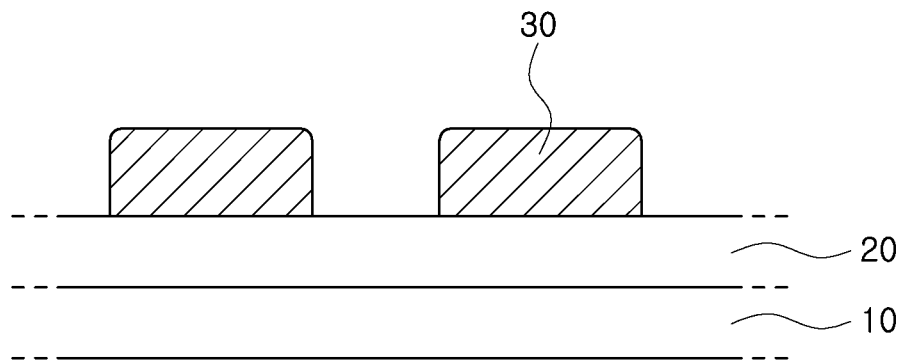
Figure 2C:
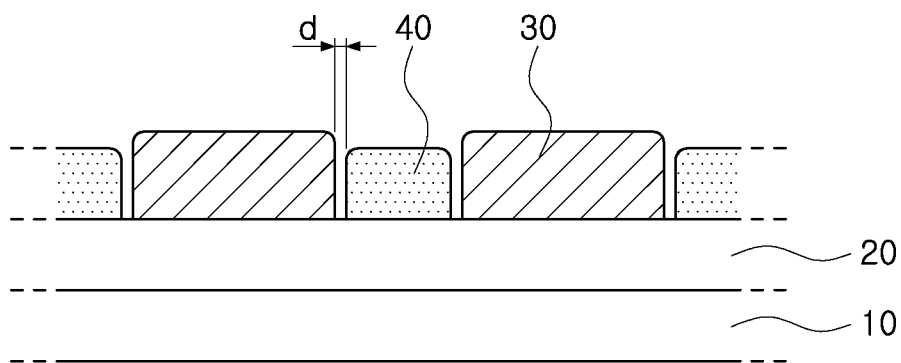
Figure 3:
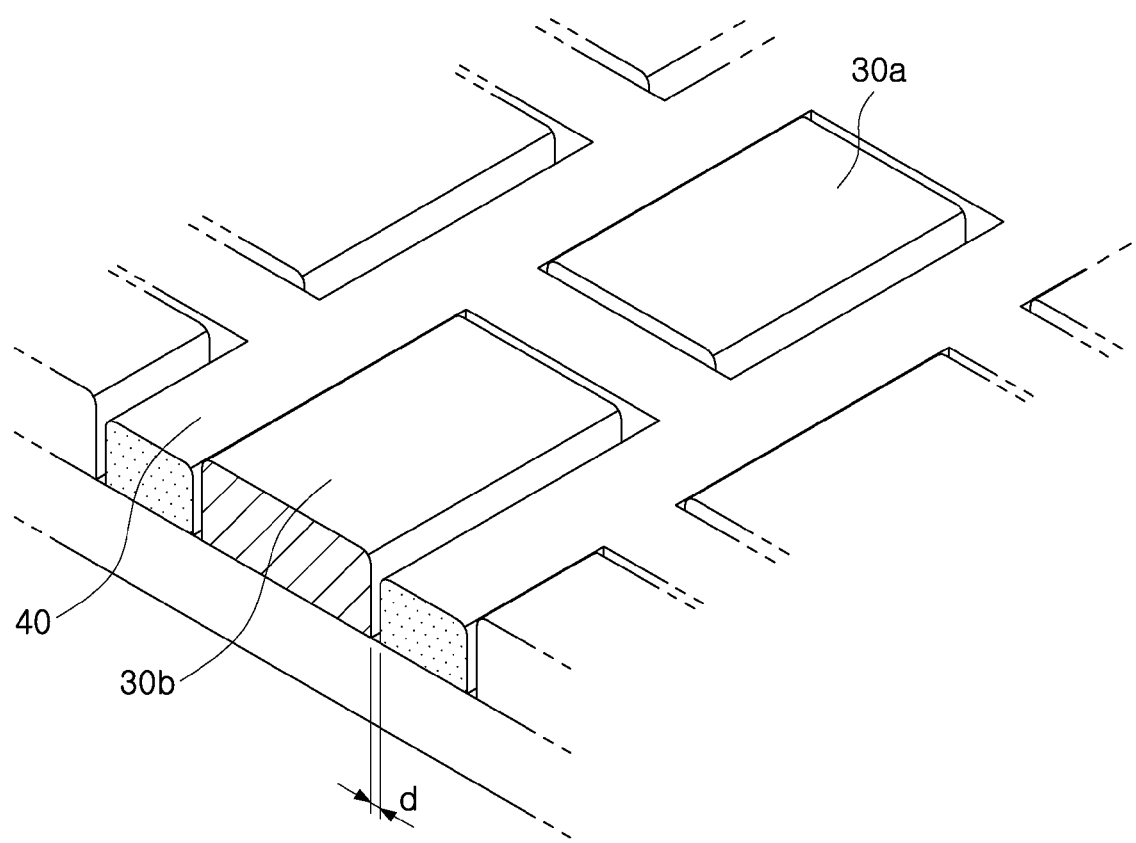
FIG. 3 is a perspective view showing a ceramic sheet having internal electrode patterns and dielectric patterns printed thereon according to an exemplary embodiment of the present invention.
Figure 4:
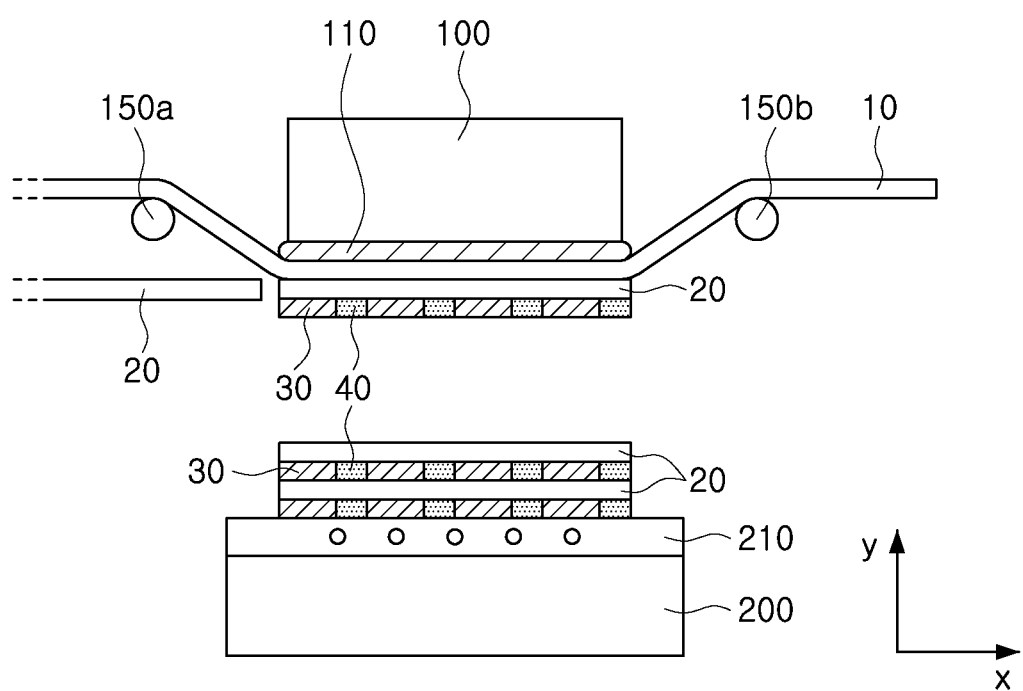
FIG. 4 is a view schematically showing a stacking process of ceramic sheets using a thermal transfer method according to an exemplary embodiment of the present invention.

FIG. 1 is a cross-sectional view of a multilayer ceramic electronic component according to an exemplary embodiment of the present invention; FIGS. 2A through 2C are views showing a fabricating method of a multilayer ceramic electronic component according to an exemplary embodiment of the present invention; FIG. 3 is a perspective view showing a ceramic sheet having internal electrode patterns and dielectric patterns printed thereon according to an exemplary embodiment of the present invention; and FIG. 4 is a view schematically showing a stacking process of ceramic sheets using a thermal transfer method according to an exemplary embodiment of the present invention.

Hereinafter, a multilayer ceramic electronic component and a fabricating method thereof according to exemplary embodiments of the present invention will be described with reference to FIGS. 1 through 4.

Referring to FIG. 1, a multilayer ceramic electronic component 1 according to an exemplary embodiment of the present invention includes a multilayer ceramic body having a plurality of ceramic sheets 20 stacked therein, internal electrode patterns 30 formed on the ceramic sheets 20, and first and second external electrodes 15a and 15b formed on both ends of the multilayer ceramic body and electrically connected to the internal electrode patterns 30.

The multilayer ceramic body, which is formed by stacking the plurality of ceramic sheets and sintering them, is integrally formed so that interfaces between adjacent ceramic sheets are virtually indiscernible in a sintered state.

The ceramic sheet 20 may be formed by applying a first ceramic paste including a first ceramic powder, an organic solvent, and an organic binder to a carrier film 10.

According to an exemplary embodiment of the present invention, in order to fabricate the thin ceramic sheet 20 having a thickness of 1 μm or less, the first ceramic powder having a particle size of 100 nm or less may be used.

According to an exemplary embodiment of the present invention, in order to implement a multilayer ceramic capacitor having high capacitance, each of the ceramic sheets 20 may have a thickness of 1 μm or less, preferably, 0.7 to 0.9 μm after being stacked and compressed.

The internal electrode patterns 30, which are formed on the ceramic sheets in the stacking process of the plurality of ceramic sheets, are formed by sintering within the multilayer ceramic body, having a single ceramic sheet therebetween.

The internal electrode patterns 30 may be a pair of a first internal electrode pattern and a second internal electrode pattern having different polarities, and may be disposed to face each other along a direction of stacking dielectric layers. Ends of the first and second internal electrode patterns may be alternately exposed to both ends of the multilayer ceramic body.

The internal electrode patterns 30 may be made of a conductive metal. For example, the internal electrode patterns 30 may be made of at least one selected from the ground consisting of Ni, Cu, Pd, and an alloy thereof, without being limited thereto.

Dielectric patterns 40 each may be formed on a single ceramic sheet 20 in the stacking process of the plurality of ceramic sheets, while enclosing the internal electrode patterns 30. Accordingly, the dielectric patterns may be integrated with adjacent ceramic sheets by sintering.

The dielectric patterns 40 are formed by applying a second ceramic paste, including a second ceramic powder, an organic binder, and an organic solvent, to the ceramic sheets. The dielectric paste may be applied to the ceramic sheets 20 to enclose the internal electrode patterns 30 by, for example, a screen printing method.

The first and second ceramic powders may be materials having high permittivity. Barium titanate ($BaTiO_3$)-based materials, lead complex perovskite-based materials, strontium titanate ($SrTiO_3$)-based materials, or the like, preferably, barium titanate ($BaTiO_3$) powder may be used; however, the materials of the first and second ceramic powders are not limited thereto.

According to an exemplary embodiment of the present invention, particularly, the dielectric patterns 40 are printed between the internal electrode patterns 30 to remove stepped portions due to the formation of the internal electrode patterns during the stacking of the ceramic sheets. The dielectric patterns 40 formed by the second ceramic powder serve to prevent non-uniform expansion of the internal electrode patterns, while improving adhesion between the internal electrode patterns and the ceramic sheets.

The first ceramic powder forming the ceramic sheets 20 may be densified by sintering. Meanwhile, the second ceramic powder, forming the dielectric patterns 40 provided between the ceramic sheets, is sintered more slowly than the ceramic sheets. Cracks or deformations may occur due to a difference in sintering speeds of the ceramic sheets 20 and the dielectric patterns 40.

Therefore, according to an exemplary embodiment of the present invention, the particle size of the second ceramic powder may be smaller than that of the first ceramic powder. According to the exemplary embodiment of the present invention, the second ceramic powder having the particle size of 80 nm or less may be used.

The dielectric patterns 40 may be densified by using the second ceramic powder denser than the first ceramic powder, whereby the dielectric patterns 40 may be sintered at a rapid speed.

Accordingly, the sintering speeds of the ceramic sheets 20 and the dielectric patterns 40 may be matched with each other by using the second ceramic powder having the particle size smaller than that of the first ceramic powder, whereby cracks or deformations of the multilayer ceramic body may be prevented.

The organic binder is included in the first and second ceramic pastes to secure the dispersibility of the ceramic powders. Without being limited thereto, ethylcellulose, polyvinyl butyral, and a mixture thereof may be used therefor.

The content of the organic binder may be 10 to 20 wt % with respect to 100 wt % of the first or second ceramic paste. When the amount of the organic binder is 10 wt % or less, the strength of the ceramic sheets and the dielectric patterns is deteriorated, such that the strength of a chip may be deteriorated or a sheet attack phenomenon by the solvent included in the internal electrode paste may be caused. Therefore, the amount of the organic binder is preferably 10 to 20 wt %.

In addition, as the organic binder, a mixture of ethylcellulose and polyvinyl butyral may be used. Here, a ratio of ethylcellulose and polyvinyl butyral included in the organic binder may be 10:90 to 20:80.

According to an exemplary embodiment of the present invention, the printed shapes of the internal electrode patterns may be uniformized by adding ethylcellulose to the ceramic paste, and the adhesion between the internal electrode layers and the ceramic sheets may be improved by adding polyvinyl butyral thereto.

In addition, the dielectric patterns 40 may be spaced apart from the internal electrode patterns having a predetermined interval therebetween.

Cracks or deformations may be caused in the multilayer ceramic body due to a difference in expansion rates between the internal electrode patterns and the dielectric patterns during the firing thereof. In order to supplement the difference in the expansion rates, the dielectric patterns 40 may be spaced apart from the internal electrode patterns 30 having a predetermined internal therebetween, preferably, 0.8 μm or less.

FIGS. 2A through 2C are views showing a fabricating method of a multilayer ceramic electronic component according to an exemplary embodiment of the present invention.

Referring to FIGS. 2A through 2C, a fabricating method of a multilayer ceramic electronic component according to an exemplary embodiment of the present invention includes: preparing a plurality of dielectric ceramic sheets including a first ceramic powder; printing internal electrode patterns on the plurality dielectric ceramic sheets; forming dielectric patterns around the internal electrode patterns, the dielectric patterns including a second ceramic powder and each having a thickness equal to or thinner than that of each of the internal electrode patterns; and compressing and stacking the plurality of dielectric ceramic sheets having the internal electrode patterns and the dielectric patterns formed thereon using a thermal transfer method.

Referring to FIG. 2A, in order to fabricate the multilayer ceramic electronic component, a first ceramic paste for ceramic sheets is applied to a carrier film 10 to form the ceramic sheets 20.

As the carrier film for the formation and moving of the ceramic sheets 20, polyethylene terephthalate may be used; however, a material of the carrier film is not limited thereto.

The first ceramic paste, which includes the first ceramic powder, an organic binder, and an organic solvent, may be applied to the carrier film to thereby form the ceramic sheet.

According to an exemplary embodiment of the present invention, in order to fabricate thin ceramic sheets, the first ceramic powder having the particle size of 100 nm or less may be used, whereby the ceramic sheets each having the thickness of 1 μm or less may be fabricated.

Referring to FIG. 2B, after the ceramic sheets 20 are formed, the plurality of internal electrode patterns 20 may be printed thereon while having a predetermined interval between adjacent internal electrode patterns 30.

The internal electrode patterns 30 may be formed by applying the conductive paste including a conductive metal powder, an organic binder, and an organic solvent to the ceramic sheets 20 using a method such as a screen printing method, a gravure printing method, or the like, without being limited thereto.

Referring to FIG. 2C, the dielectric patterns 40 may be printed on the ceramic sheets 20 having the internal electrode patterns 30 printed thereon.

The dielectric patterns 40, which are formed by applying a second ceramic paste for dielectric patterns, including the second ceramic powder, an organic binder, and an organic solvent, to the ceramic sheets 20, may be printed between the plurality of internal electrode patterns 30 using a method such as the screen printing method by way of example.

The second ceramic powder may have a particle size smaller than that of the first ceramic powder, preferably, a particle size of 80 nm or less. Since the dielectric patterns 40 include the second ceramic powder having the particle size smaller than that of the first ceramic powder, they may have the densification to be sintered at a rapid speed. That is, a difference in the sintering speed of the dielectric patterns and the ceramic sheets may be alleviated.

In addition, the organic binder includes polyvinyl butyral and ethylcellulose, whereby the adhesion between the internal electrode patterns and the ceramic sheets may be improved.

The dielectric patterns 40 may be printed between the plurality of internal electrode patterns 30, and may be spaced apart from the internal electrode patterns 30 having a predetermined interval therebetween.

Since the dielectric patterns 40 are printed between the internal electrode patterns 30, the adhesion between the internal electrode patterns 30 and the ceramic sheets to be stacked thereon may be improved.

Since the internal electrode patterns 30 includes a fine conductive powder in order to be thinned, types and amount of resins included therein is reduced to uniformize printed shapes. Accordingly, the adhesion between the internal electrode patterns 30 and the ceramic sheets 20 is deteriorated.

However, according to an exemplary embodiment of the present invention, the dielectric patterns 40 are printed to enclose the internal electrode patterns 30, and include the organic binder having excellent adhesion such as polyvinyl butyral, such that the adhesion between the internal electrode patterns 30 and the ceramic sheets 20 is significantly improved, as compared to the ceramic sheets 20 having only the internal electrode patterns 30 formed thereon.

In addition, the dielectric patterns 40 are printed between the internal electrode patterns 30, whereby stepped portions in the multilayer ceramic body may be removed when the ceramic sheets 20 are stacked and compressed.

Meanwhile, the internal electrode patterns 30 are extended during the stacking and compressing of the ceramic sheets 20. The further the internal electrode patterns 30 are extended, the higher the incidence of short-circuits in a completed chip is.

However, according to an exemplary embodiment of the present invention, the dielectric patterns 40 are printed around the internal electrode patterns 30, whereby excessive extension of the internal electrode patterns 30 during the stacking and compressing processes may be prevented. Accordingly, the rate of short-circuits generated in the chip may be lowered.

According to an exemplary embodiment of the present invention, a rate of change in a length of the internal electrode patterns 30 during the stacking and compressing processes may be reduced to 10% or less. The rate of change in the length of the internal electrode patterns 30 during the stacking and compressing processes may be more preferably reduced to 5% or less. Further, the rate of change in the length of the internal electrode patterns 30 may be further reduced by adjusting the intervals between the internal electrode patterns 30 and the dielectric patterns 40.

Accordingly, short-circuits in the internal electrode patterns due to the excessive extension thereof may be prevented.

FIG. 3 is a perspective view showing a ceramic sheet having internal electrode patterns and dielectric patterns printed thereon according to an exemplary embodiment of the present invention.

Referring to FIGS. 2C and 3, the dielectric patterns 40 according to an exemplary embodiment of the present invention may be disposed between the first and second internal electrode patterns 30a and 30b to be spaced apart therefrom having a predetermine interval d therebetween.

Since the materials forming the dielectric patterns 40 and the plurality of internal electrode patterns 30a and 30b are different from each other, cracks and deformations in the multilayer ceramic body may be generated due to a difference in expansion rates between the dielectric patterns and the internal electrode patterns during the firing thereof. Accordingly, in order to supplement the difference in the expansion rates, the dielectric patterns 40 may be spaced apart from the plurality of internal electrode patterns 30a and 30b having the predetermined interval d therebetween.

The internal electrode patterns and the dielectric patterns may be printed to have the interval of 0.8 μm or less therebetween. When the interval between the internal electrode patterns and the dielectric patterns exceeds 0.8 μm, it is excessively wide, such that a surface of the multilayer ceramic body may be bent. Therefore, the interval between the internal electrode patterns and the dielectric patterns is preferably 0.8 μm or less.

FIG. 4 is a view schematically showing a stacking process of ceramic sheets using a thermal transfer method according to an exemplary embodiment of the present invention.

The ceramic sheets 20, having the internal electrode patterns 30 and the dielectric patterns 40 formed thereon, may be stacked using a thermal transfer method according to an exemplary embodiment of the present invention.

The thermal transfer method may be used in order to stack the ceramic sheets each having a thickness of 1 μm.

A thermal transfer stacking apparatus according to an exemplary embodiment of the present invention includes a head 100 having a first heat supplier 110 formed thereon, and a support 200 having a second heat supplier 210 formed thereon.

The head 100 may cause the ceramic sheets to be stacked on the support 200 by performing a vertical reciprocating movement in a y-axis direction.

The ceramic sheets 20 are formed on the carrier film 10 and are connected to first and second roll parts 150a and 150b, whereby the ceramic sheets 20 may be stacked on the support 200 by the movement of the head 100.

The ceramic sheets 20 may be separated from the carrier film 10 by the first and second heat suppliers 110 and 210 respectively formed on the head 100 and the support 200, and the internal electrode patterns 30 and the dielectric patterns 40 attached to the head 100 are bonded to the ceramic sheet 20 mounted on the support through pressure applied by the head 100 and the support 200, whereby the stacking process may be performed.

In the case of the thin layer having a thickness of 1 μm or less, since the adhesion between the internal electrode pattern 30 and the ceramic sheet 20 is lower than that between the carrier film 10 and the ceramic sheet 20, high temperature and high pressure should be applied thereto in order to perform the stacking of the ceramic sheets 20.

In the case in which the ceramic sheets are stacked under conditions of high temperature and high pressure, the occurrence frequency of stacking defects due to the deformation or damage of the ceramic sheets is increased.

Particularly, when the ceramic sheets are thermally transferred at high pressure, defects in the ceramic sheets such as an air trap may occur.

However, according to an exemplary embodiment of the present invention, since the dielectric patterns 40 are formed around the internal electrode patterns 30 to improve the adhesion between the internal electrode patterns and the ceramic sheets 20, the ceramic sheets 20 may be stacked at a relatively low temperature and a relatively low pressure.

Accordingly, the deformation of the ceramic sheets may be prevented and the damage of the ceramic sheets may be prevented.

According to an exemplary embodiment of the present invention, the stacking of the ceramic sheets may be performed at a temperature of 80° C. or less, and the ceramic sheets each having a thickness of 1 μm or less may be stacked even when a pressure of 20 ton or less is applied thereto.

In the case in which the thermal transfer is performed at a temperature exceeding 80° C. or at a pressure of 20 ton or more, the ceramic sheets are deformed or a structural defect such as the air trap may occur in the multilayer ceramic body. Therefore, the thermal transfer may be performed at a temperature of 80° C. or less and at a pressure of 20 ton or less.

Therefore, according to the exemplary embodiments of the present invention, since the ceramic sheets are compressed and stacked using the thermal transfer method, the ceramic sheets each having the thickness of 1 μm, more preferably, 0.7 to 0.9 μm, may be stacked.

According to the exemplary embodiments of the present invention, although the above-mentioned thin ceramic sheets are stacked using the thermal transfer method, the dielectric patterns are formed around the internal electrode patterns to improve the adhesion between the ceramic sheets and the internal electrode patterns, whereby the thermal transfer may be performed under conditions of relatively low temperature and low pressure. In addition, the dielectric patterns are formed around the internal electrode patterns, whereby the occurrence of structural defects in the multilayer ceramic body or the occurrence of interlayer short-circuits due to the air trap occurred in the surfaces and peripheral portions of the internal electrode patterns may be prevented.

Further, although the ceramic sheets are compressed and stacked by applying low pressure and low temperature thereto, stepped portions between the internal electrode patterns and the ceramic sheets are removed by the dielectric patterns, whereby short-circuits occurred due to the excessive extension of the internal electrode patterns may be prevented.

As set forth above, according to exemplary embodiments of the present invention, dielectric patterns are printed on ceramic sheets, whereby a thermal transfer method may be used at low pressure and low temperature. Accordingly, interlayer adhesion may be increased, while thinning the ceramic sheets, to thereby prevent the occurrence of an air trap between the stacked ceramic sheets.

In addition, a multilayer ceramic electronic component capable of preventing the deformation of internal electrodes through the printed dielectric patterns to avoid defects in an electrode structure and a cutting defect, thereby improving the reliability of a product, and the fabricating method thereof may be provided.

As set forth above, according to exemplary embodiments of the present invention, a multilayer ceramic electronic component achieving a compact size and thinness, while having high reliability by preventing short-circuit defects, may be fabricated.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic electronic component comprising:
a multilayer ceramic body including a first ceramic powder and having a plurality of ceramic sheets stacked therein, each ceramic sheet having a thickness of 1 μm or less;
internal electrode patterns formed on the plurality of ceramic sheets; and
dielectric patterns formed on the ceramic sheets to enclose the internal electrode patterns, the dielectric patterns including a second ceramic powder having a particle size smaller than that of the first ceramic powder and each having a thickness equal to or thinner than that of each of the internal electrode patterns.

2. The multilayer ceramic electronic component of claim 1, wherein the particle size of the first ceramic powder is 100 nm or less, and
the particle size of the second ceramic powder is 80 nm or less.

3. The multilayer ceramic electronic component of claim 1, wherein each of the ceramic sheets has a thickness of 0.7 to 0.9 μm.

4. The multilayer ceramic electronic component of claim 1, wherein the dielectric patterns and the internal electrode patterns have an interval of 0.8 μm or less therebetween.

5. The multilayer ceramic electronic component of claim 1, wherein the ceramic sheets are formed by applying a first ceramic paste, including the first ceramic powder, an organic binder including ethylcellulose and polyvinyl butyral, and an organic solvent, and
the dielectric patterns are formed by applying a second ceramic paste, including the second ceramic powder, an organic binder including ethylcellulose and polyvinyl butyral, and an organic solvent.

6. The multilayer ceramic electronic component of claim 5, wherein a content of the organic binder included in the first or second ceramic paste is 10 to 20 wt % with respect to 100 wt % of the first or second ceramic paste.

7. The multilayer ceramic electronic component of claim 6, wherein the organic binder has a ratio of the ethylcellulose and the polyvinyl butyral ranging from 10:90 to 20:80.

* * * * *